(12) United States Patent
Cho et al.

(10) Patent No.: US 8,539,594 B2
(45) Date of Patent: Sep. 17, 2013

(54) APPARATUS AND METHOD FOR MANAGING IDENTITY INFORMATION

(75) Inventors: Young-seob Cho, Daejeon-si (KR);
Jin-man Cho, Daejeon-si (KR);
Sang-rae Cho, Daejeon-si (KR);
Dae-seon Choi, Daejeon-si (KR);
Jong-hyouk Noh, Daejeon-si (KR);
Soo-Hyung Kim, Daejeon-si (KR);
Seung-hyun Kim, Daejeon-si (KR);
Kwan-soo Jung, Daejeon-si (KR);
Deok-jin Kim, Daejeon-si (KR);
Seung-hun Jin, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 639 days.

(21) Appl. No.: 12/612,451

(22) Filed: Nov. 4, 2009

(65) Prior Publication Data

US 2010/0146586 A1 Jun. 10, 2010

(30) Foreign Application Priority Data

Dec. 5, 2008 (KR) .................. 10-2008-0123109
Mar. 24, 2009 (KR) .................. 10-2009-0025132

(51) Int. Cl.
*G06F 7/04* (2006.01)
(52) U.S. Cl.
USPC .......................................... 726/26
(58) Field of Classification Search
None
See application file for complete search history.

(56) References Cited

U.S. PATENT DOCUMENTS

| 7,617,309 | B2 | 11/2009 | Yoshida et al. | |
|---|---|---|---|---|
| 2003/0149781 | A1* | 8/2003 | Yared et al. | 709/229 |
| 2005/0289341 | A1* | 12/2005 | Ritola et al. | 713/168 |
| 2007/0204168 | A1 | 8/2007 | Cameron et al. | |

FOREIGN PATENT DOCUMENTS

| JP | 2001-344379 | 12/2001 |
|---|---|---|
| KR | 1020020026039 | 4/2002 |
| KR | 2003-0057383 | 7/2003 |

OTHER PUBLICATIONS

Beatty, John et al., "Liberty ID-WSF Discovery Service Specification," Liberty Alliance Project, Draft Version 2.0-02 (2004).

* cited by examiner

*Primary Examiner* — Brandon Hoffman
(74) *Attorney, Agent, or Firm* — Nelson Mullins Riley & Scarborough LLP

(57) ABSTRACT

Provided are an apparatus and method for managing identity information. The apparatus includes a contract detail manager managing details of an identity information sharing contract made between a user and an identity provider (IdP) wanting to provide identity information about the user, and details of an identity information sharing contract made between the user and an identity consumer (IdC) wanting to be provided with the identity information about the user, an IdP selector selecting an IdP capable of providing the identity information about the user based on the details of the sharing contract when a request for the identity information about the user is input from the IdC, and an information provider obtaining information according to the identity information request from the selected IdP, and providing the obtained information to the IdC. The apparatus and method can solve a problem that all of a user's identity information is provided to an IdC according to the user's comprehensive agreement.

15 Claims, 4 Drawing Sheets

APPARATUS AND METHOD FOR MANAGING IDENTITY INFORMATION

CROSS-REFERENCE TO RELATED APPLICATIONS

This application claims the benefit under 35 U.S.C. §119 (a) of Korean Patent application Nos. 10-2008-0123109, filed on Dec. 5, 2008, and 10-2009-0025132, filed on Mar. 24, 2009, the disclosures of which are incorporated by reference in their entirety for all purposes.

BACKGROUND

1. Field

The following description relates to information protection in a web service, and more particularly to an apparatus and method for managing identity information.

2. Description of the Related Art

In general, when a user registers for a website such as a portal site, he/she inputs all user information required by the website into the website system. At this time, the user accepts an agreement that he/she will provide his/her own information, thereby providing his/her identity information to the website.

According to this method, once a user accepts such an agreement, all of his/her personal information is provided to the corresponding website, and the website obtains more of the user's personal information than needed. Also, in general, users must accept an agreement about deletion, holding period, etc., of personal information set by a website party, and thus have no right to control their personal information in the current method of registering for a website.

In the ID-WSF discovery service of Liberty Alliance, an identity provider (IdP) providing user identity registers information about what kind of information about a user it provides in a discovery server. And, when an identity consumer (IdC) consuming user identity needs user identity information, it searches for an IdP providing the information and requests the IdP to inquire about the user information. However, in this method, users are excluded from identity flow in which identity information is requested and provided, and thus users' right to control their personal information is still weakened. Also, since a clear agreement on information provision and consumption is not made, it is not easy to solve a problem such as identity information leakage.

In another conventional method, users select IdPs, and the selection results are transferred to requesters who request identity. This method can strengthen users' right of selection. However, this method does not involve a clear agreement on information provision and consumption, and thus a problem such as identity information leakage is still at issue.

SUMMARY

The following description relates to an identity information sharing method that can increase users' degree of participation in providing identity information.

The following description also relates to an identity information sharing method that can facilitate resolution of a problem such as identity information leakage.

In a general aspect, there is provided an apparatus for managing identity information, including: a contract detail manager managing details of an identity information sharing contract made between a user and an identity provider (IdP) wanting to provide identity information about the user; an IdP selector selecting an IdP capable of providing the identity information about the user based on the details of the sharing contract when a request for the identity information about the user is input from an identity consumer (IdC); and an information provider obtaining information according to the identity information request from the selected IdP, and providing the obtained information to the IdC.

In another aspect, there is provided a method of managing identity information, including: receiving a request for identity information about a user from an identity consumer (IdC); selecting an identity provider (IdP) capable of providing the identity information about the user based on details of an identity information sharing contract made between the user and an IdP wanting to provide the identity information about the user; and obtaining information according to the identity information request from the selected IdP and providing the obtained information to the IdC.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
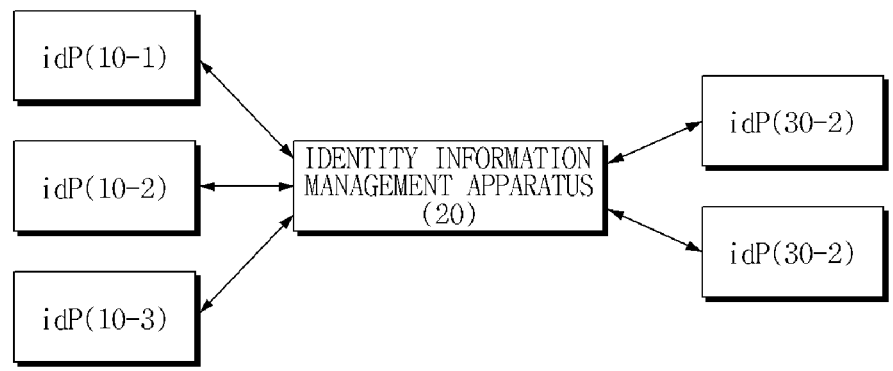
FIG. 1 is a block diagram of an identity sharing system according to an exemplary embodiment.

FIG. 1 is a block diagram of an identity sharing system according to an exemplary embodiment.

As shown in the drawing, the identity sharing system includes a plurality of identity providers (IdPs) 10-1, 10-2 and 10-3, a plurality of identity consumers (IdCs) 30-1 and 30-2, and an identity information management apparatus 20 that can be accessed by the IdCs 30-1 and 30-2 and users and performs interaction between the IdPs 10-1, 10-2 and 10-3 and the IdCs 30-1 and 30-2.

The IdPs 10-1, 10-2 and 10-3 provide the users' identity information in a web service, and the IdCs 30-1 and 30-2 require the user information provided by the IdPs 10-1, 10-2 and 10-3. For example, the IdCs 30-1 and 30-2 may be the portal sites which users want to register for. In this exemplary embodiment, the IdPs 10-1, 10-2 and 10-3 and the IdCs 30-1 and 30-2 make an identity sharing contract with the users, and a component that manages the made sharing contract is included. More specifically, the IdCs 30-1 and 30-2 transmit an identity sharing inquiry request message to the identity information management apparatus 20 based on the sharing contract made with the users. And, the IdPs 10-1, 10-2 and 10-3 process the identity sharing inquiry request from the identity information management apparatus 20, and transfer a response to the identity sharing inquiry request based on the sharing contract made with the users.

The identity information management apparatus 20 performs interaction between the IdPs 10-1, 10-2 and 10-3 and the IdCs 30-1 and 30-2. When the IdCs 30-1 and 30-2 request identity information of a specific user, the identity information management apparatus 20 searches for an IdP that can provide the corresponding information, and obtains and provides the information to the IdCs 30-1 and 30-2. In other words, the identity information management apparatus 20 may serve to control the flow of identity information between the IdPs 10-1, 10-2 and 10-3 and the IdCs 30-1 and 30-2.

Figure 2:
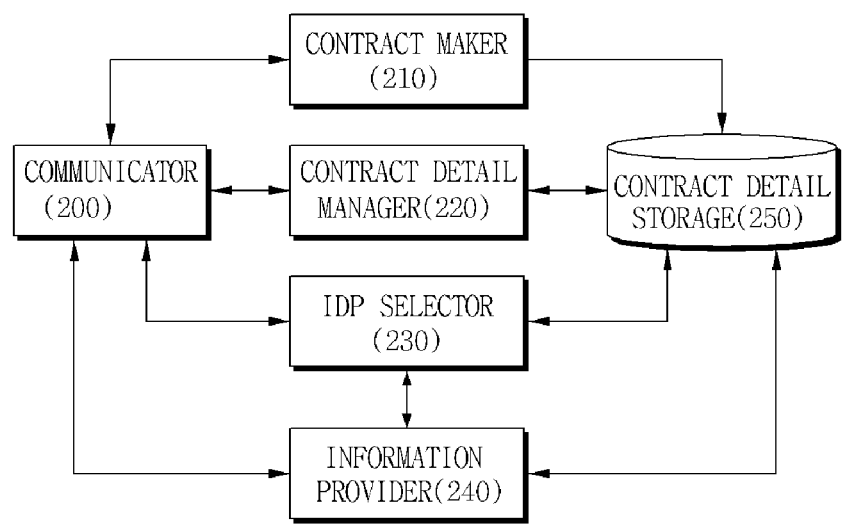
FIG. 2 is block diagram of an apparatus for managing identity information according to an exemplary embodiment.

FIG. 2 is block diagram of an apparatus for managing identity information according to an exemplary embodiment.

As shown in the drawing, the apparatus for managing identity information according to an exemplary embodiment includes a communicator 200, a contract maker 210, a contract detail storage 250, a contract detail manager 220, an IdP selector 230, and an information provider 240.

The communicator 200 may be implemented by a communication module capable of network communication, for example, Internet communication. In this exemplary embodiment, the communicator 200 performs data transmission and reception between IdPs and IdCs.

The contract maker 210 makes an identity sharing contract between users and IdPs. For example, a user may check an information item permitted to be shared by an IdP among identity information, thereby making the sharing contract. Also, the contract maker 210 makes an identity sharing contract between users and IdCs.

The contract detail storage 250 is implemented by a data storage. In this exemplary embodiment, the contract detail storage 250 stores details of the identity information sharing contract made between users and IdPs or IdCs by the contract maker 210.

The contract detail manager 220 manages the details of the identity information sharing contract that is made by the contract maker 210 between users and IdPs, which provide the users' identity information, and stored in the contract detail storage 250. Also, the contract detail manager 220 manages the details of the identity information sharing contract that is made by the contract maker 210 between users and IdCs, which need the users' identity information, and stored in the contract detail storage 250. In this exemplary embodiment, the contract detail manager 220 may update or delete the details of the sharing contracts stored in the contract detail storage 250.

When a request for identity information about a user received from an IdC is input through the communicator 200, the IdP selector 230 selects an IdP that can provide the identity information about the user based on the details of the sharing contract stored in the contract detail storage 250.

In this exemplary embodiment, when two or more IdPs are selected, the IdP selector 230 provides information about the selected IdPs to the user and selects one of the IdPs selected by the user.

The information provider 240 obtains information according to the identity information request from the IdP selected by the IdP selector 230 and provides the obtained information to the IdC.

Figure 3:
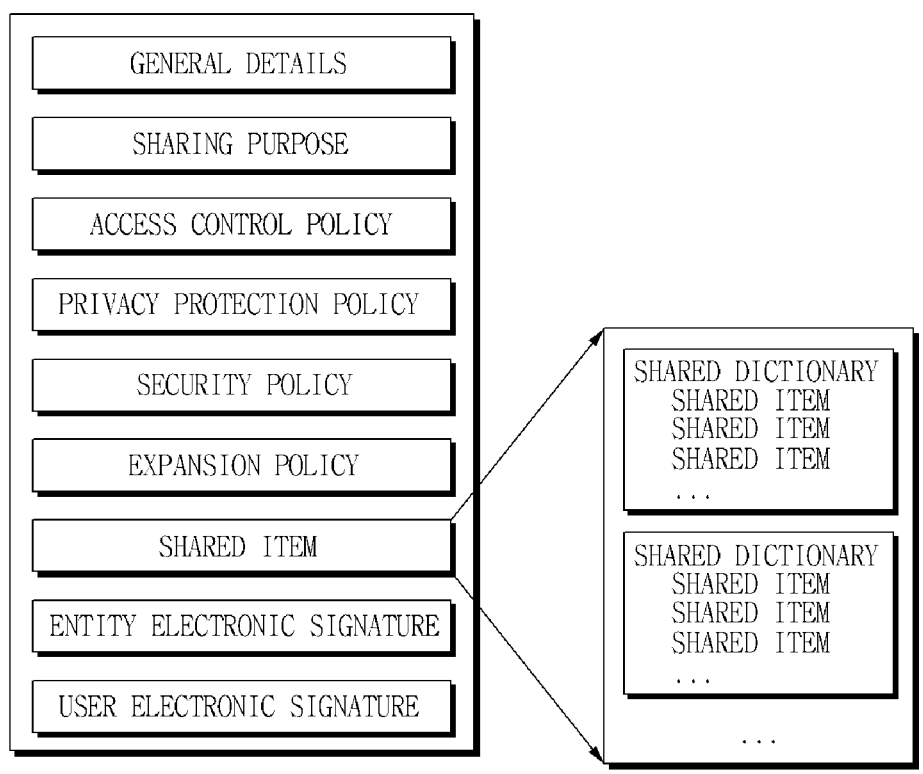
FIG. 3 shows examples of details of a sharing contract according to an exemplary embodiment.

FIG. 3 shows examples of details of a sharing contract according to an exemplary embodiment.

As shown in the drawing, details of a sharing contract according to an exemplary embodiment include general details, a sharing purpose, an access control policy, a privacy protection policy, a security policy, an expansion policy, a shared item, an entity electronic signature, and a user electronic signature.

The sharing purpose describes a use of shared identity information. For example, the use of identity information may be, for example, registration for a website, or purchase of a product. The access control policy describes a policy for controlling access to shared identity information. The privacy protection policy may be information about how long inquired information should be kept and then discarded when an IdC requests inquiry about the identity information. The security policy includes information about a method in which an IdP, an IdC and a user authenticate each other, whether to perform message encryption when a message is transferred, and an encryption method. The expansion policy is an element for representing a policy to be expanded later.

The shared item is information about data items permitted to be shared between both parties that actually make an identity sharing contract. In this exemplary embodiment, the shared item may consist of shared dictionaries. A shared dictionary denotes a category of shared data, and shared items denote items permitted to be shared in the category.

For example, it is assumed that there is a dictionary "personal profile," a first name, a last name, an address, a telephone number, and an e-mail address are included in the personal profile, and a bank account, a bank name of the bank account, a depositor, a bank balance, a loan account, a bank name of the loan account, a loaner, and a loan balance are included in a dictionary "finance."

When both parties only share the first name, the last name and the address among the personal profile information and the account information among the financial information, the shared item consists of {personal profile, {first name, last name, address}} and {finance, {bank account, bank name of bank account, depositor, bank balance}}.

The entity electronic signature denotes an electronic signature of an IdP or IdC making the identity sharing contract, and the user electronic signature denotes an electronic signature of a user for the identity sharing contract. In an exemplary embodiment, the electronic signatures may be omitted according to mutual consent.

Figure 4:
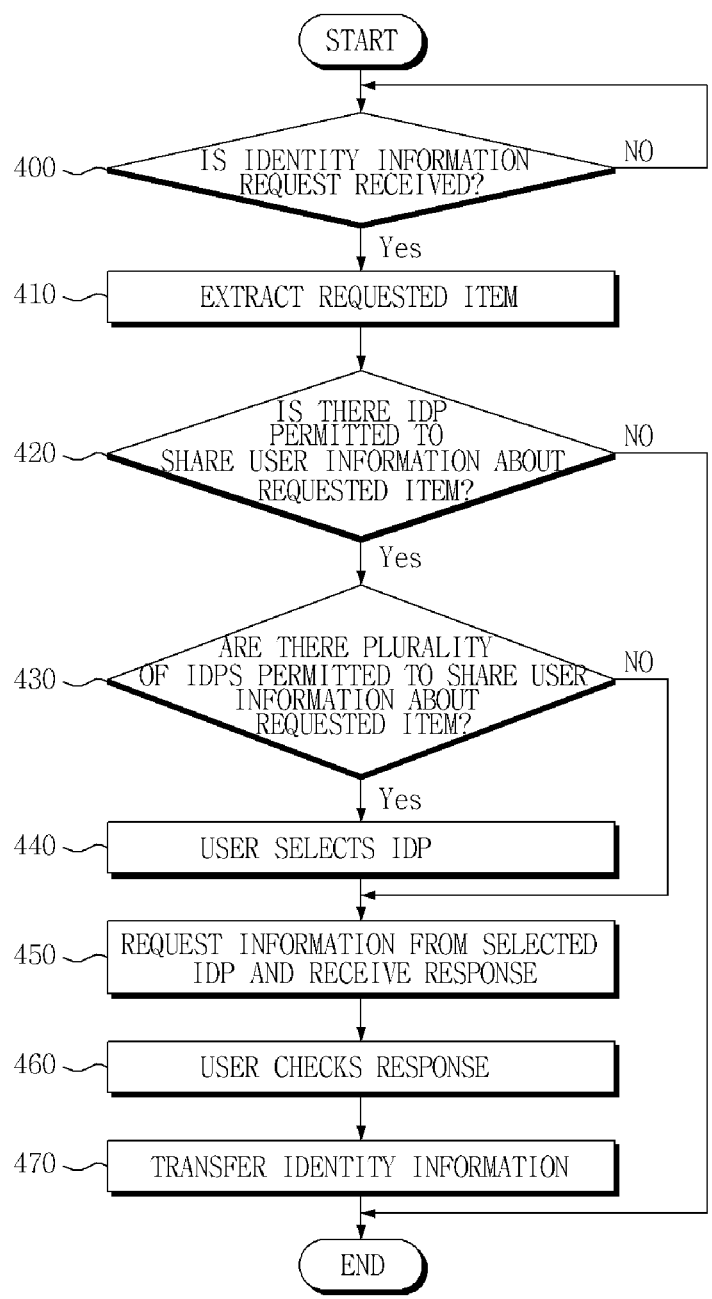
FIG. 4 illustrates a flowchart illustrating a method of managing identity information according to an exemplary embodiment.

FIG. 4 illustrates a flowchart illustrating a method of managing identity information according to an exemplary embodiment.

When an identity information request is received from an IdC (operation 400), identity items requested by the IdC are extracted (operation 410). For example, the identity items may be {first name, last name} corresponding to a part of a personal profile dictionary.

Then, it is checked whether or not there is an IdP permitted to share user information about the requested items based on sharing contracts made between IdPs and a user (operation 420).

At this time, when there are a plurality of IdPs capable of providing the information about the identity items requested by the IdC (operation 430), information about the IdPs is provided to the user, and the user selects one of the IdPs (operation 440).

Then, the selected IdP is requested to inquire about information about the identity items, and the result of inquiring about identity information of the user is received in response to the request (operation 450).

Subsequently, the received inquiry result is output to the user (operation 460), and provided to the IdC (operation 470). Additionally, the inquiry result is output to the user, and when the user approves sharing of the inquiry result, it is provided to the IdC.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

As apparent from the above description, a sharing contract about data items shared by an IdP, IdC and a user who is an entity of identity is made, thereby solving a problem that all of the user's identity information is provided to the IdC according to the user's comprehensive agreement.

In addition, a user can be located in the middle of the flow of user identity information occurring between IdPs and IdCs and select an IdP and information to be transferred, and thus it is possible to strengthen the user's right to control his/her personal information.

Furthermore, by intervening in identity information flow, a user can minimize the probability of information leakage, and it can be clearly determined based on a sharing contract that is responsible for personal information leakage.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. An apparatus for managing identity information, comprising:
  a contract detail manager managing details of an identity information sharing contract made between a user and an identity provider (IdP) wanting to provide identity information about the user and updating or deleting the details of the sharing contract stored in the contract detail storage;
  an IdP selector selecting an IdP capable of providing the identity information about the user based on the details of the sharing contract when a request for the identity information about the user is input from an identity consumer (IdC); and
  an information provider obtaining information according to the identity information request from the selected IdP, and providing the obtained information to the IdC,
  wherein when two or more IdPs capable of providing the identity information about the user are selected, the IdP selector selects one of the IdPs selected by the user.

2. The apparatus of claim 1, wherein the information provider outputs the obtained information so that the user can check the information, and provides the information to the IdC when the user approves sharing of the information.

3. The apparatus of claim 1, further comprising a contract maker making the identity information sharing contract between the user and the IdP wanting to provide the identity information about the user.

4. The apparatus of claim 3, wherein the contract maker makes an identity information sharing contract between the user and the IdC wanting to be provided with the identity information about the user.

5. The apparatus of claim 4, wherein the information provider provides permitted information to the IdC with reference to details of the identity information sharing contract made by the contract maker.

6. The apparatus of claim 3, wherein the details of the identity information sharing contract include information about a shared item permitted to be shared between the both parties making the contract.

7. The apparatus of claim 6, wherein the details of the identity information sharing contract further include at least one of general contract details, a sharing purpose, an access control policy, a privacy protection policy, a security policy, an expansion policy, an entity electronic signature, and a user electronic signature.

8. The apparatus of claim 4, wherein the contract detail manager updates the details of the identity information sharing contract made between the user and the IdP wanting to provide the identity information about the user or between the user and the IdC wanting to be provided with the identity information about the user and stored.

9. A method of managing identity information, comprising:
  receiving a request for identity information about a user from an identity consumer (IdC);
  selecting an identity provider (IdP) capable of providing the identity information about the user based on details of an identity information sharing contract made between the user and an IdP wanting to provide the identity information about the user wherein a contract manager updates or deletes the details of the sharing contract;
  obtaining information according to the identity information request from the selected IdP and providing the obtained information to the IdC; and
  after the selecting of the IdP, when two or more IdPs capable of providing the identity information about the user are selected, enabling the user to select one of the selected IdPs.

10. The method of claim 9, wherein the providing of the obtained information includes outputting the information so that the user can check the information, and providing the information to the IdC when the user approves sharing of the information.

11. The method of claim 9, further comprising making the identity information sharing contract between the user and the IdP wanting to provide the identity information about the user.

12. The method of claim 9, further comprising making an identity information sharing contract between the user and the IdC wanting to be provided with the identity information about the user.

13. The method of claim 12, wherein the providing of the obtained information includes providing identity information about the user permitted to be shared to the IdC with reference to details of the made identity information sharing contract.

14. The method of claim 11, wherein the details of the identity information sharing contract include information about a shared item permitted to be shared between the both parties making the contract among the identity information.

15. The method of claim 14, wherein the details of the identity information sharing contract further include at least one of general contract details, a sharing purpose, an access control policy, a privacy protection policy, a security policy, an expansion policy, an entity electronic signature, and a user electronic signature.

* * * * *